United States Patent [19]
Baker et al.

[11] Patent Number: 5,465,521
[45] Date of Patent: Nov. 14, 1995

[54] SCENTED CARTRIDGES AND CONTAINER

[76] Inventors: Jeffrey L. Baker; Jeffrey R. Legare, both of P.O. Box 306, Athol, Mass. 01331

[21] Appl. No.: 340,598
[22] Filed: Nov. 16, 1994
[51] Int. Cl.⁶ .................................................. A01M 31/00
[52] U.S. Cl. ...................... 43/1; 206/0.5; 239/55
[58] Field of Search .................. 43/1, 44.99; 239/55, 239/57, 60; 206/315.11, 0.5, 804

[56] References Cited

U.S. PATENT DOCUMENTS 2,791,058  5/1957  Bettini .......................... 206/0.5 X
3,084,471  4/1963  Alspaugh ....................... 43/44.99
3,102,465  9/1963  Montesano ..................... 206/0.5
4,374,571  2/1983  Hirvela ......................... 206/0.5 X Primary Examiner—P. Austin Bradley
Assistant Examiner—Jeanne M. Elpel

[57] ABSTRACT

A cartridge for dispensing an animal attracting scent. The inventive device includes a plurality of scent cartridges stored within a container sealed by a cap. The cap includes a depending hook extending from an interior of the cap for extracting an individual scent cartridge from the container to eliminate contact of the user with the scent cartridge to preclude contamination thereof.

3 Claims, 3 Drawing Sheets

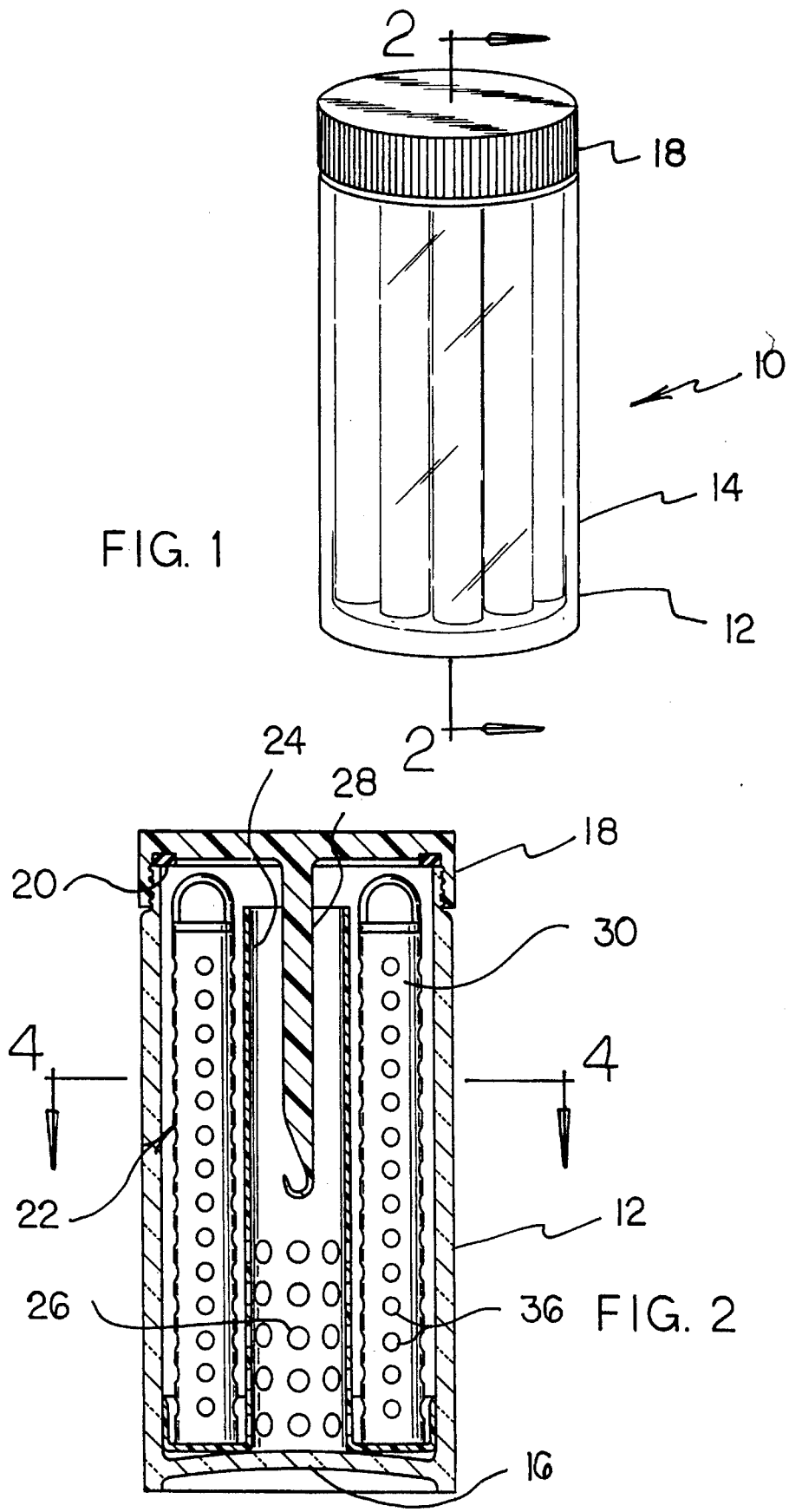

SCENTED CARTRIDGES AND CONTAINER

BACKGROUND OF THE INVENTION

1. Field of the Invention

The present invention relates to scent dispensers and more particularly pertains to scented cartridges and a container for dispensing an animal attracting scent.

2. Description of the Prior Art

The use of scent dispensers is known in the prior art. More specifically, scent dispensers heretofore devised and utilized are known to consist basically of familiar, expected and obvious structural configurations, notwithstanding the myriad of designs encompassed by the crowded prior art which have been developed for the fulfillment of countless objectives and requirements.

Known prior art scent dispensers include U.S. Pat. Nos. 5,074,439; 5,060,411; 5,048,218; 4,788,787; and 4,523,717.

While these devices fulfill their respective, particular objectives and requirements, the aforementioned patents do not disclose scented cartridges and a container for dispensing an animal attracting scent which includes a plurality of scent cartridges stored within the container and sealed by a cap, with the cap including a depending hook extending from an interior thereof for extracting an individual scent cartridge from the container to eliminate contact of the user with the scent cartridge to preclude contamination thereof.

In these respects, the scented cartridges and container according to the present invention substantially departs from the conventional concepts and designs of the prior art, and in so doing provides an apparatus primarily developed for the purpose of dispensing an animal attracting scent.

SUMMARY OF THE INVENTION

In view of the foregoing disadvantages inherent in the known types of scent dispensers now present in the prior art, the present invention provides a new scented cartridges and container construction wherein the same can be utilized for dispensing an animal attracting scent. As such, the general purpose of the present invention, which will be described subsequently in greater detail, is to provide a new scented cartridges and container apparatus and method which has many of the advantages of the scent dispensers mentioned heretofore and many novel features that result in a scented cartridges and container which is not anticipated, rendered obvious, suggested, or even implied by any of the prior art scent dispensers, either alone or in any combination thereof.

To attain this, the present invention generally comprises a cartridge for dispensing an animal attracting scent. The inventive device includes a plurality of scent cartridges stored within a container sealed by a cap. The cap includes a depending hook extending from an interior of the cap for extracting an individual scent cartridge from the container to eliminate contact of the user with the scent cartridge to preclude contamination thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new scented cartridges and container apparatus and method which has many of the advantages of the scent dispensers mentioned heretofore and many novel features that result in a scented cartridges and container which is not anticipated, rendered obvious, suggested, or even implied by any of the prior art scent dispensers, either alone or in any combination thereof.

It is another object of the present invention to provide a new scented cartridges and container which may be easily and efficiently manufactured and marketed.

It is a further object of the present invention to provide a new scented cartridges and container which is of a durable and reliable construction.

An even further object of the present invention is to provide a new scented cartridges and container which is susceptible of a low cost of manufacture with regard to both materials and labor, and which accordingly is then susceptible of low prices of sale to the consuming public, thereby making such scented cartridges and containers economically available to the buying public.

Still yet another object of the present invention is to provide a new scented cartridges and container which provides in the apparatuses and methods of the prior art some of the advantages thereof, while simultaneously overcoming some of the disadvantages normally associated therewith.

Still another object of the present invention is to provide a new scented cartridges and container for dispensing an animal attracting scent.

Yet another object of the present invention is to provide a new scented cartridges and container which includes a plurality of scent cartridges stored within the container and sealed by a cap, with the cap including a depending hook extending from an interior thereof for extracting an individual scent cartridge from the container to eliminate contact of the user with the scent cartridge to preclude contamination thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a plurality of scented cartridges stored within a container according to the present invention.

FIG. 2 is a cross sectional view taken along line 2—2 of FIG. 1.

DESCRIPTION OF THE PREFERRED EMBODIMENT

Figure 3:
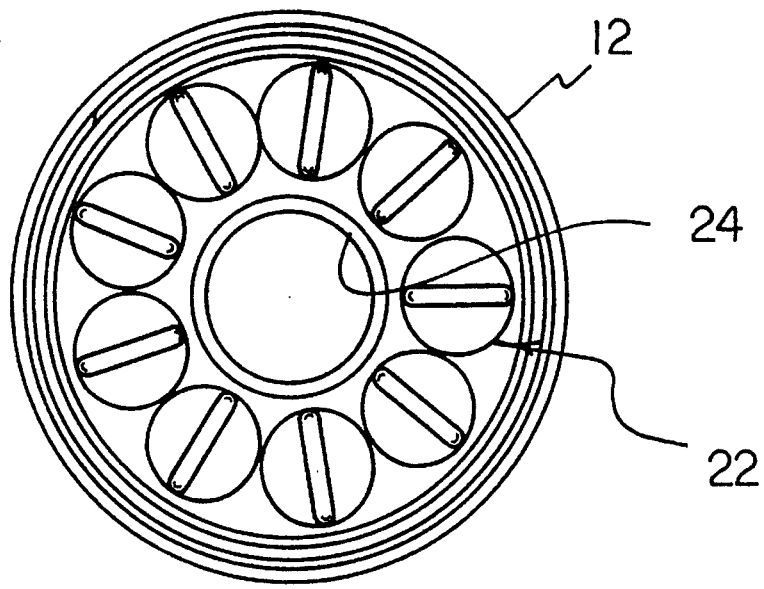
FIG. 3 is a top plan view of the container with the cap removed.
Figure 4:
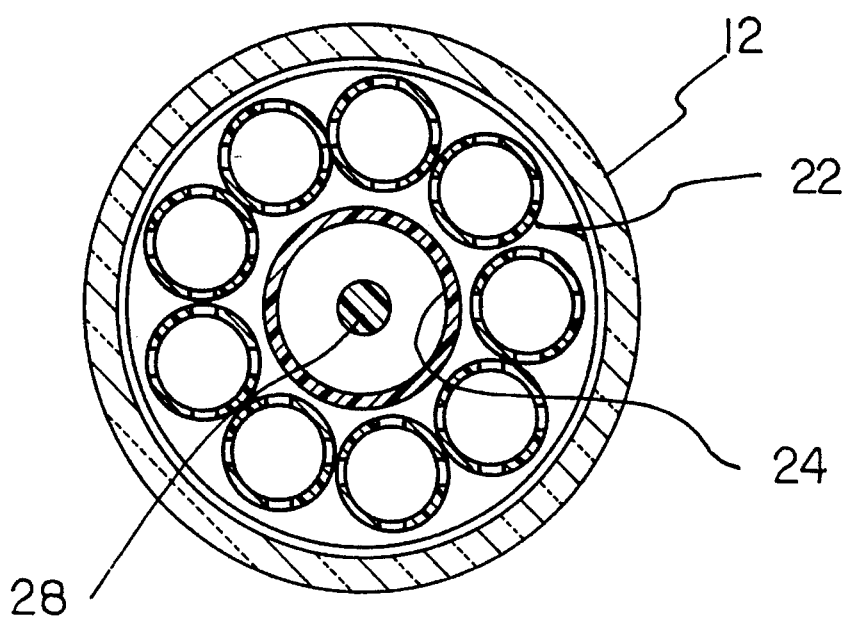
FIG. 4 is a cross sectional view taken along line 4—4 of FIG. 2.

With reference now to the drawings, and in particular to FIGS. 1–6 thereof, a new scented cartridge and container embodying the principles and concepts of the present invention and generally designated by the reference numeral 10 will be described.

More specifically, it will be noted that the scented cartridges and container 10 comprises a substantially cylindrical container 12 having a cylindrical side wall 14 closed at lower end thereof by a bottom wall 16 extending thereacross. An upper end of the cylindrical side wall 14 is threaded and can be rotatably engaged to a cap 18 to completely enclose an interior of the container 12. To ensure a sealing engagement of the upper end of the cylindrical side wall 14 with the cap 18, an annular seal 20 is secured to an interior of the cap 18 and is operable to engage an upper edge of the container 12, as shown in FIG. 2. The container 12 is operable to receive within an interior thereof a plurality of scent cartridges 22 arranged in an annular array and extending vertically within the interior of the container. To maintain the scent cartridges 22 in the annular orientation illustrated in FIGS. 3 and 4, a center tube 24 extends upwardly from the bottom wall 16 and is substantially concentric within the interior of the container 12. The center tube 24 is provided with a plurality of apertures 26 which permit a scented fluid or attractant to enter the center tube 24. A depending hook 28 is mounted to an interior surface of the cap 18 and extends into the center tube 24 when the cap is engaged to the container 12, as shown in FIG. 2. The vent apertures 26 thus allow fluid positioned within the container 12 to enter the center tube 24 to coat the depending hook 28. The depending hook 28 is operable to engage an individual one of the scent cartridges 22 to effect extraction thereof, whereby the extracted scent cartridge can then be hung onto a tree branch or other projecting support structure without necessitating contact of the user with the scent cartridge which could contaminate the scent thereof.

Figure 5:
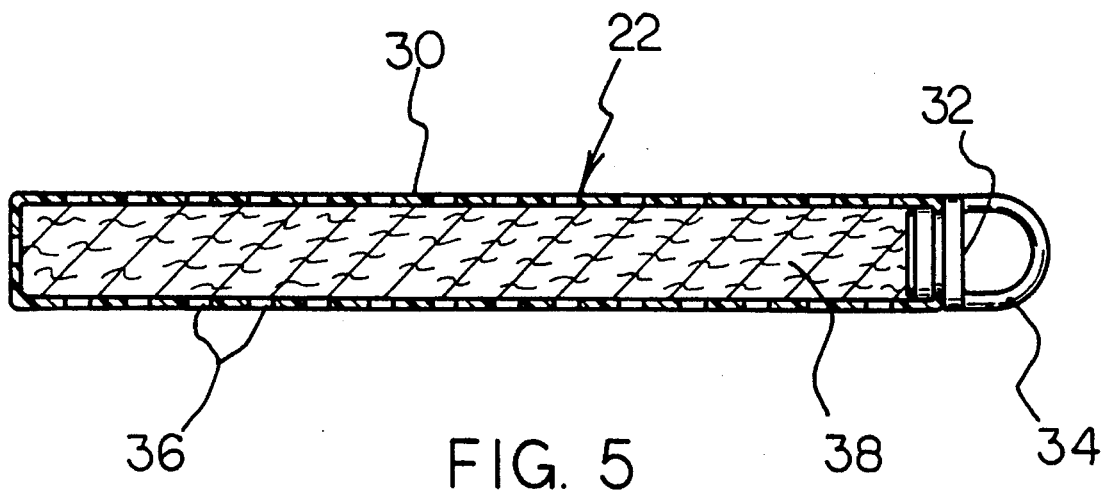
FIG. 5 is a cross sectional view of an individual scent cartridge.
Figure 6:
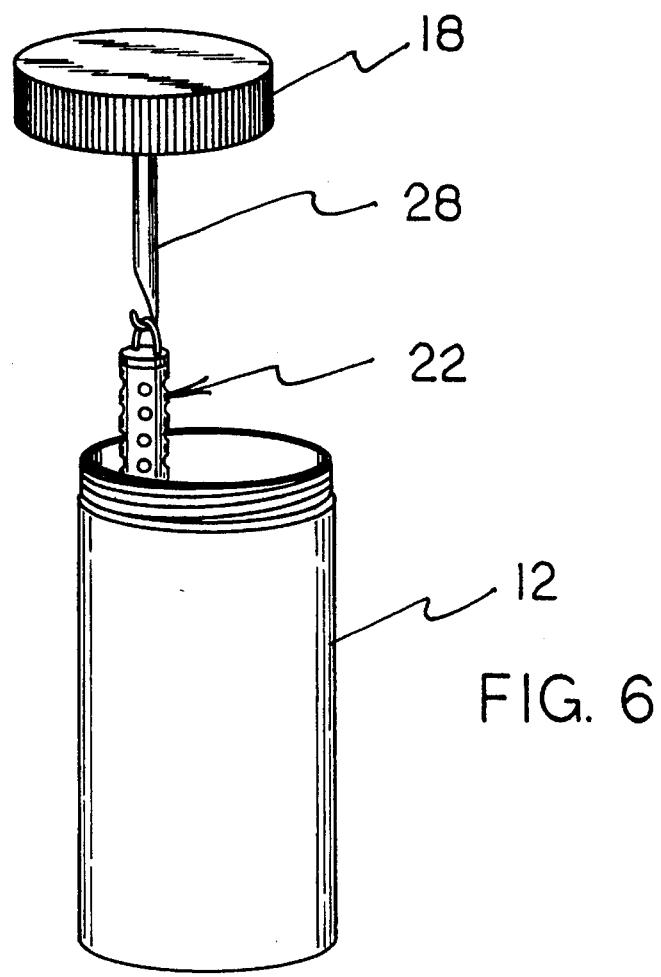
FIG. 6 is an exploded isometric illustration detailing a removal of an individual one of the scent cartridges from the container.

A shown in FIG. 5, each of the scent cartridges 22 comprises an elongated cylindrical body 30 having a closed first end and an open second end, with a cartridge closure 32 frictionally engaged to the opened second end thereof. The cartridge closure 32 includes an arcuate loop 34 to which the depending hook 28 can be engaged as shown in FIG. 6. The elongated cylindrical body 30 of the scent cartridge 22 includes a plurality of dispensing apertures 36 directed therethrough which permits communication between an interior of the cylindrical body and the surrounding ambient air. Fibrous material 38 having absorbent qualities is positioned within the interior of the elongated cylindrical body 30 and is operable to absorb and subsequently permit evaporation or dispensing of the scented fluid through the dispensing aperture 36 when the scent cartridge 22 is removed from the container 12.

In use, the present invention 10 permits an individual to easily carry and dispense a scented fluid without contamination of the scent cartridges 22 through contact of the scent cartridge with a user. In this connection, the scent cartridges 22 can be positioned within the container 12, a scented fluid can then be positioned within the container and permitted to be absorbed within the fibrous material 38 of each of the scent cartridges as well as permitted to coat the depending hook 28 of the cap 18. Upon transportation of the device 10 to a desired hunting area, the cap 18 can be rotatably removed from the container 12 and the individual scent cartridges 22 extracted therefrom as shown in FIG. 6 and hung from projecting support structures, such as tree limbs or the like to permit dispensing of the attracting scented fluid. Because the vent apertures 26 permit the scented fluid to enter into the interior of the center tube 24 to coat the depending hook 28, the scented fluid is additionally applied to the arcuate loop 34 of the cartridge closure 32 to disguise or eliminate any scent present on the exterior loop 34. In other words, any previous contact between a user and the arcuate loop 34 of the scent cartridge 22 leaving a contaminated scent along the arcuate loop is negated by the application of the scented fluid from the depending hook 28 during removal of the individual scent cartridge as shown in FIG. 6.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A scented cartridges and container comprising:

a substantially cylindrical container having an open upper end;

a cap securable to said open upper end of said container to completely enclose an interior of said container, said cap having a hook depending from an interior center surface thereof; and, a plurality of scent cartridges extending vertically within said interior of the container, wherein said hook is operable to engage an individual scent cartridge to effect manual extraction of said cartridge from said container.

2. The scented cartridges and container of claim 1, wherein said container includes a center tube extending upwardly from a bottom wall thereof and being positioned substantially concentrically within said interior of said container with said depending hook projecting into said center tube, said center tube being provided with a plurality of apertures extending therethrough which permit a scented fluid placed within said container to enter said center tube, whereby said fluid is permitted to contact said depending hook.

3. The scented cartridges and container of claim 2, wherein each of said scent cartridges comprises an elongated cylindrical body having a closed first end and an open second end, a cartridge closure frictionally engaged to said open second end thereof, said cartridge closure including an arcuate loop to which said depending hook can be engaged, said elongated cylindrical body including a plurality of dispensing apertures directed therethrough which permit communication between an interior of said cylindrical body and surrounding ambient air, and an absorbent fibrous material positioned within said interior of said elongated cylindrical body for absorbing said fluid and subsequently permit dispensing of said scented fluid through said dispensing aperture when said scent cartridge is removed from said container.

\* \* \* \* \*